Patented May 5, 1925.

1,536,326

UNITED STATES PATENT OFFICE.

HARRY E. BROOKBY, OF EVANSTON, ILLINOIS, ASSIGNOR TO UNITED STATES GYPSUM COMPANY, OF CHICAGO, ILLINOIS, A CORPORATION OF ILLINOIS.

PROCESS FOR THE MANUFACTURE OF DILUTE SOLUTIONS OF MAGNESIUM SULPHATE.

No Drawing.   Application filed December 27, 1921.  Serial No. 525,158.

*To all whom it may concern:*

Be it known that I, HARRY E. BROOKBY, a citizen of the United States, residing at Evanston, in the county of Cook and State of Illinois, have invented new and useful Improvements in Processes for the Manufacture of Dilute Solutions of Magnesium Sulphate, of which the following is a specification.

This invention relates to a process for the manufacture of a dilute solution of magnesium sulphate for use in the commercial production of magnesium oxide.

Magnesium oxide when mixed with a solution of magnesium chloride becomes a hard, dense and stone like material.

A commercial method of producing magnesium oxide for this purpose consists in mixing commercial hydrated magnesia or hydrated dolomitic lime, with an excess of a dilute solution of magnesium sulphate in a large mixing tank having a constantly moving agitator. The proportion of sulphuric acid radical in the magnesium sulphate must be present in sufficient quantity to combine with all of the calcium oxide in the lime, converting it into gypsum, and the magnesium of the magnesium sulphate is converted into partially hydrated magnesium oxide. At the end of the reaction the gypsum and partially hydrated magnesium oxide are precipitated and as the solubility of gypsum is greater than the other precipitate it is dissolved and decanted leaving a sludge of partially hydrated magnesium oxide which is dried and calcined to produce the commercial magnesium oxide.

It is proposed in accordance with this invention to change the magnesium oxide present in dolomitic lime to magnesium sulphate in a dilute solution adaptable for use in the above described commercial method by adding to the milk of dolomitic lime a solution of gypsum, calcium sulphate, as the sulphuric acid radical carrier, and passing gaseous carbon dioxide through the mixture, for in a dilute solution the solubility of gypsum is not substantially affected by the presence of magnesium sulphate in the same solution.

Expressed graphically, using equivalent weights and ignoring water of hydration in the compound, the reaction is:

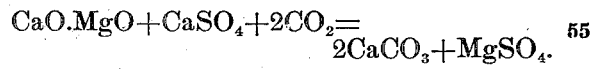

$$CaO.MgO + CaSO_4 + 2CO_2 = 2CaCO_3 + MgSO_4.$$

In carrying out this process the dolomitic lime is hydrated in any desired manner and is suspended in water, making a thin milky solution. To this milk of lime is added a mixture of gypsum and water in such proportions that the solution is always saturated with gypsum and there is some excess of undissolved gypsum. The gypsum solution and milk of lime are mixed and passed through any desirable device for absorbing gaseous carbon dioxide, such as an ordinary cooling tower, and in the course of passage of the solution through this device it meets a current of gas carrying carbon dioxide.

In this process the calcium hydroxide of the milk of lime, having a solubility of one part in six to eight hundred parts of water, is converted into calcium carbonate having a solubility of one part in seventy-seven thousand parts of water. The gypsum, having a solubility of substantially one part in three to six hundred parts of water, reacts with the magnesium hydroxide, having a solubility of approximately one part in one hundred and eleven thousand parts of water, to form calcium carbonate and magnesium sulphate having a solubility of one part in seventy-seven thousand parts of water and one part in one part of water, respectively. The calcium carbonate is then sedimented into a sludge and the clear dilute solution of magnesium sulphate is decanted and ready for use in the commercial method described. By thus employing this dilute solution in the presence of carbon dioxide the sulphuric acid radical of the gypsum can be attached to the magnesium of the magnesium oxide present to yield magnesium sulphate.

It is recognized that this is not a process for the commercial production of magnesium sulphate crystals, epsom salts, for the market, as the cost of evaporating and concentrating such a dilute solution for crystallization would be prohibitive. The dilute solution as produced by this invention is for the particular use in conjunction with the commercial method first described and makes that method and this process independent of an outside source of sulphuric acid radical in the production of magnesium oxide.

The calcium sulphate solution decanted from the magnesium oxide sludge in the commercial method described can be used as the sulphuric acid radical carrier in this process by the addition of gypsum to produce the proper proportions needed. This gypsum can of course be made by the action of sulphuric acid on limestone or can be the native gypsum ground sufficiently fine to give a suitable surface factor.

What I claim is:

The process of manufacturing magnesium sulphate in solution, consisting in hydrating dolomitic lime, suspending it in water, adding thereto a saturated solution of gypsum carrying an excess of gypsum crystals to maintain solution, passing gaseous carbon dioxide through the mixed solutions, sedimenting the calcium carbonate into a sludge, and decanting the clear solution of magnesium sulphate.

HARRY E. BROOKBY.